United States Patent [19]

Horvath

[11] Patent Number: 5,447,992
[45] Date of Patent: Sep. 5, 1995

[54] HEAT AND OZONE RESISTANT NBR/EPICHLOROHYDRIN BLENDS

[75] Inventor: James W. Horvath, Cuyahoga Falls, Ohio

[73] Assignee: The Goodyear Tire & Rubber Company, Akron, Ohio

[21] Appl. No.: 259,223

[22] Filed: Jun. 13, 1994

[51] Int. Cl.⁶ ............................................. C08L 71/02
[52] U.S. Cl. ................................... 525/187; 525/263; 525/293; 525/296; 525/332.5; 525/333.8; 525/404; 525/942
[58] Field of Search ............... 525/187, 404, 942, 263, 525/293, 296, 332.5, 333.8

[56] References Cited

U.S. PATENT DOCUMENTS

| | | | |
|---|---|---|---|
| 4,197,382 | 4/1980 | Fukushima et al. | 525/403 |
| 4,251,648 | 2/1981 | Oetzel | 525/187 |
| 4,297,453 | 10/1981 | Coran et al. | 525/408 |
| 4,408,013 | 10/1983 | Barnhouse | 525/187 |
| 4,661,563 | 4/1987 | Sasaki et al. | 525/185 |
| 4,775,716 | 10/1988 | Kipouras et al. | 525/187 |
| 4,857,590 | 8/1989 | Gaggar et al. | 525/187 |
| 4,885,341 | 12/1989 | Aonuma et al. | 525/187 |
| 4,942,906 | 7/1990 | Igarashi et al. | 138/126 |

FOREIGN PATENT DOCUMENTS 0233520 8/1987 European Pat. Off. ............ 525/187
1246039 3/1969 United Kingdom .

OTHER PUBLICATIONS

"Bound Antioxidant Stabilized NBR in Automotive Applications" James W. Horvath, *Elastomerics*, Aug., 1979.

*Primary Examiner*—John C. Bleutge
*Assistant Examiner*—Randy Gulakowski
*Attorney, Agent, or Firm*—Alvin T. Rockhill; J. D. Wolfe

[57] ABSTRACT

Cured blends of acrylonitrile/butadiene (NBR)/epichlorohydrin rubbers are provided that are free of poisonous lead compounds with ozone resistance of 10 hours or more and good heat resistance and fuel and oil resistance. These acrylonitrile/butadiene rubbers contain 28 to 33% by weight of acrylonitrile. The epichlorohydrin rubbers are useful in this invention which contains at least 4 to 12% of allyl glycidyl ether and may contain 0 to 35% of ethylene oxide, preferably 2 to 6% and up to 15%. The acrylonitrile/butadiene rubber is preferably of so-called bound antioxidant type which contains about 1 to about 10% by weight of polymerized attached antioxidant containing monomer.

13 Claims, No Drawings

HEAT AND OZONE RESISTANT NBR/EPICHLOROHYDRIN BLENDS

TECHNICAL FIELDS

This invention relates to a method of producing a more economical homogenous vulcanized blend of acrylonitrile butadiene rubber and epichlorohydrin rubber that exhibits physicals equal to those of the individual rubbers or superior thereto. More specifically, this invention provides a homogenous blend of modified epichlorohydrin rubber and acrylonitrile-butadiene bound antioxidant terpolymer and rubber that is cheaper than 100% epichlorohydrin rubber but with physicals equivalent or better than epichlorohydrin rubber and free of harmful lead compounds.

BACKGROUND ART

Although epichlorohydrin rubbers and acrylonitrile-butadiene rubbers are polar, their polarity and compatibility are different. Consequently, their blends are generally considered incompatible and their blends exhibit low ozone resistance unless cured with a lead curative but lead cured rubbers are objectionable for harm to the environment. Further, these rubbers need different cure systems and degrade by different mechanism. For example, epichlorohydrin rubbers degrade with oxidation through a reversion mechanism while acrylonitrile-butadiene rubber undergoes resinification as it oxidizes. Further, the resinification degradation is harmful to use in fuel and oil application. Therefore, it has been desirable to produce blends of these rubbers that have good to superior ozone resistance, better heat aging and resistance to fuel and oil, and freedom from lead curatives.

Although, British Patent No. 1,246,039 obtain good ozone resistance of vulcanized blends of acrylonitrile butadiene rubber and epichlorohydrin rubber cured with lead compounds, these vulcanizates contain undesirable lead compounds that present problems.

DISCLOSURE OF INVENTION AND BEST MODES

I have discovered that modified acrylonitrile-butadiene rubber and a modified epichlorohydrin rubbers can be blended in the usual and conventional Banbury or mill equipment to give a homogenous blend which has cured physical equivalent or better than the physicals of the individual components of the blend and at a lower cost than 100% epichlorohydrin rubber and without use of harmful lead curatives. Also, these modified blends can be cured to yield a compatible blend with enhanced tensile, compression set, ozone resistance, heat ageing and resistance to fuel and oil.

The modified epichlorohydrin rubbers may be co-polymers but preferably are ter- polymers of the epichlorohydrin monomer with allyl glycidal ether (AGE) and ethylene oxide. AGE is used to yield the copolymer or preferably with ethylene oxide to yield the terpolymer of epichlorohydrin. Preferably these modified epichlorohydrin rubbers contain from about 4% to about 12% AGE by weight and may contain from 0 to 35 but preferably 15 or more percent ethylene oxide.

The modified acrylonitrile-butadiene rubbers useful in this invention contain a Mooney plasticity ML-100° C./4' of 20 to 65, and preferably of 25 to 50 and an acrylonitrile content of 28 to 33% by weight. The acrylonitrile-butadiene polymers available under the trade name CHEMIGUM N765 which contains 28% acrylonitrile while CHEMIGUM HR665 and CHEMIGUM HR662 which have 33% acrylonitrile are useful in this invention.

The necessary cure system will also cure both the modified acrylonitrile-butadiene rubber and the modified epichlorohydrin rubbers simultaneously. The resulting cured blends have superior ozone resistance when the epichlorohydrin, is Hydrin TX-1 that is a terpolymer containing 12% AGE, relative to epichlorohydrin, Hydrin T with 4% AGE. These modified epichlorohydrin rubbers have Mooney plasticity ML-100° C./4' of about 60 to 110 and preferably 60–90.

Use of modified acrylonitrile-butadiene rubber of 28 to 33% acrylonitrile content with 4 to 12% AGE modified polymer of epichlorohydrin rubbers preferably the ter- polymer in my blends allows the blends to be cured with sulfur cures and peroxide cure system, although the peroxide cure system gives far superior ozone resistance. It should be explained that the use of a modified soap/calcium oxide and peroxide/co-agent cure systems, as shown in Table III, gives better ozone resistance relative to a low sulfur EV type cure. Not only are superior ozone resistance properties enhanced, other physicals such as tensile strength, scorch resistance, tear strength, compression set resistance, and abrasion resistance are enhanced. Also, oil and fuel resistance of my blends are essentially equivalent to the 100% epichlorohydrin and allowance of the blends to be used for products that come in contact with fuel oil and related chemicals.

The well-known bound antioxidant acrylonitrile butadiene rubbers are especially preferred in this invention as they offer greatly improved resistance to degrading by resinification which has been a problem with exposure to hot fuels and oils.

These bound antioxidant acrylonitrile/butadiene rubbers are usually made by dissolving the bound antioxidant monomer such N(4-anilinophenyl) methacrylamide in small amount of the acrylonitrile and the solution is pumped into the usual polymerization mixture of acrylonitrile and butadiene as explained in Table II of James W. Horvath's article "Bound Antioxidants Stabilized NBR in Automobile Applications" at page 19–62, *Elastomerics*, August, 1979. The nature of these monomers useful for preparing bound antioxidant acrylonitrile/butadiene polymers are further described in the article by R. H. Kline, presented at the meeting of the Rubber Division, American Chemistry Society, Toronto, Canada, May 7–10, 1974. Specifically these monomers belong to the two classes of phenolic and amine types polymerizable unsaturated monomer. The above two references are incorporated herein to supply the disclosure of these monomers and their bound antioxidant acrylonitrile/butadiene rubbers produced therefrom.

The nature of this invention and its advantages are further disclosed and illustrated by the following illustrative and exemplar examples where all parts are by weight unless otherwise indicated.

Standard ASTM test procedures were used throughout the testing, except where indicated. ASTM D 3182 was used for sample preparation, ASTM D 2084 for vulcanization characteristics, ASTM D 412 for physical properties, ASTM D 295 for Compression Set, and ASTM D 471 for fluid aging. Ozone testing was done in an Orec Ozone Chamber at 50 pphm ozone concentration at 38° C. Bent Loop and 20% Stretched Samples were studied.

Polymer blends were prepared without high temperature mixing. The polymers were first blended for 1 minute in the Banbury before other ingredients were added. Curatives were again added in a second Banbury pass. No special mix precautions or procedures were attempted in mixing the blends to either prevent or encourage filler or curative migration from one polymer phase to another.

The initial screening of epichlorohydrin and acrylonitrile-butadiene bound antioxidant terpolymer blends was done in black loaded compounds using peroxide cure systems which were modified somewhat to attempt to cure both polymer phases uniformly. These formulations and associated data are listed in the following Tables.

Epichlorohydrin homopolymers and copolymers are not recommended for blend work as they are not as satisfactory as the terpolymer. The terpolymer Hydrin T containing 24% chlorine and 5% allylglycidyl ether, AGE with ethylene oxide which are capable of sulfur or peroxide curing is especially preferred. A newer terpolymer Hydrin TX-1 containing 29.5% chlorine and 11% AGE was found to be more suitable for blends.

Ozone resistance of ten (10) days was not achieved in any of the sulfur cured compounds. The peroxide cured formulations containing CHEMIGUM HR 765A and CHEMIGUM HR 665 and Hydrin T and TX-1 epichlorohydrin terpolymers produced ozone resistant compounds passing ten (10) days aging whereas other samples containing less AGE failed within three (3) days. The CHEMIGUM HR 765A and CHEMIGUM HR 665 blends exhibited no ozone cracking through 10 days of aging in Bent Loop testing with Hydrin TX-1 indicating a greater degree of blend compatibility.

The epichlorohydrin terpolymers retained 30 to 38% of their properties after 168 hours at 150° C. with silica loading but the blends retained only 5 to 8% in the wholly black loaded compounds. This situation is improved by switching to mineral filled compounds rather than all black; See Table V. The retention in physical properties of the mineral filled compound is 30% after aging 168 hours at 150° C. Further improvement would be expected with improved stabilization additives.

The silica or siliceous containing fillers are most desired for good heat aging.

As previously indicated, many of the physical properties of the blends were either improved or remained close to those of the epichlorohydrin terpolymers. Tensile strength was improved by blending with acrylonitrile butadiene bound antioxidant terpolymer. Compression Set resistance was better with the 11% AGE epichlorohydrin polymer than the 5% AGE elastomer. Abrasion resistance was significantly improved in both the DIN and Taber Abrasion tests. Fuel resistance was not adversely affected, although nitrile rubbers are not as fuel resistant as epichlorohydrin terpolymers. Oil resistance was only moderately changed, and the blends performed well in ATF Fluid aging and were satisfactory for use in air intake duct hose and selected hose under the hood of a car.

Processability of the blends was also greatly improved over that of the pure epichlorohydrin polymers which have a poor reputation for processing in factory environments. They tend to be soft and sticky due to their thermoplastic nature. Blending with bound antioxidant terpolymers allowed them to process without any difficulty in handling and curing.

The following tabulation data is presented to further exemplify the nature of this invention.

TABLE I

| Compound Ingredients | I | II |
|---|---|---|
| Epichlorohydrin Terpolymer, 24% Cl, 5% AGE | 45.00 | 45.00 |
| Epichlorohydrin Terpolymer, 29.5% Cl, 11%, AGE | | |
| 28% Acrylonitrile Butadiene Bound Antioxidant Terpolymer | 55.00 | |
| 33% Acrylonitrile Butadiene Bound Antioxidant Terpolymer | | 55.00 |
| Monomeric Diester Plasticizer | 10.00 | 10.00 |
| Polymerized 1,2-dihydro-2,2,4 trimethylquinoline | 2.00 | 2.00 |
| ASTM N 762 Black | 70.00 | 70.00 |
| Internal Lubricant | 2.00 | 2.00 |
| Calcium Oxide | 1.50 | 1.50 |
| Trimethylol Propane Trimethacrylate | 2.50 | 2.50 |
| Dicumyl Peroxide, 40% Active | 2.50 | 2.50 |
| Sodium Stearate | 1.50 | 1.50 |
| | 191.00 | 191.00 |

TABLE II

| Cured Physical Properties | I | II |
|---|---|---|
| Specific Gravity | 1.285 | 1.291 |
| Cured Physical Properties | | |
| Tensile, MPa | 13.9 | 15.2 |
| % Elongation | 263 | 305 |
| 300% Modulus | | 14.9 |
| Shore A Hardness | 66 | 67 |
| Tear Strength, Die C, kg/cm | 21.1 | 26.4 |
| Ozone Aging, 50 pphm, 38° C. | | |
| Bent Loop, days passed without cracking | 3 | 3 |
| 20% Stretched Samples, days passed without cracking | 10 | 10 |

It should be noted that higher percent acrylonitrile rubber gave the better tear resistance and tensile.

TABLE III

| Run | III | IV | V |
|---|---|---|---|
| Epichlorohydrin Terpolymer, 24% Cl, 5% AGE | | | |
| Epichlorohydrin Terpolymer, 29.5% Cl, 11% AGE | 45.00 | 45.00 | 45.00 |
| 22% Acrylonitrile Butadiene Bound Antioxidant Terpolymer | 55.00 | | |
| 28% Acrylonitrile Butadiene Antioxidant Terpolymer | | 55.00 | |
| 33% Acrylonitrile Butadiene Bound Antioxidant Terpolymer | | | 55.00 |
| Monomeric Diester Plasticizer | 10.00 | 10.00 | 10.00 |
| Polymerized 1,2-dihydro-2,2,4 trimethylquinoline | 2.00 | 2.00 | 2.00 |
| ASTM N 762 Black | 70.00 | 70.00 | 70.00 |
| Internal Lubricant | 2.00 | 2.00 | 2.00 |
| Calcium Oxide | 1.50 | 1.50 | 1.50 |
| Trimethylol Propane Trimethacrylate | 2.50 | 2.50 | 2.50 |
| Dicumyl Peroxide, 40% Active | 2.50 | 2.50 | 2.50 |
| Sodium Stearate | 1.50 | 1.50 | 1.50 |
| | 191.00 | 191.00 | 191.00 |

TABLE IV

| Cured Physical | III | IV | V |
|---|---|---|---|
| Specific Gravity | 1.285 | 1.294 | 1.297 |
| Cured Physical Properties | | | |
| Tensile, MPa | 13 | 16 | 16.3 |
| % Elongation | 214 | 223 | 274 |
| Shore A Hardness | 68 | 67 | 68 |
| Tear Strength, Die C, kg/cm | 20 | 19.3 | 24.3 |
| Ozone Aging, 50 pphm, 38° C. | | | |
| Bent Loop, days passed without cracking | 3 | 10 | 10 |
| 20% Stretched Samples, days passed without cracking | 10 | 10 | 10 |

The use of relatively high black loading adversely effected the heat aged properties relative to oil, and fuel but replacement of all or part of black with mineral fillers gave better heat ageing properties.

TABLE V

Mineral Filled Bound Antioxidant NBR Terpolymer/Epichlorohydrin Compounds

| | 1A | 2A | 3A | 4A | 5A |
|---|---|---|---|---|---|
| Epichlorohydrin Terpolymer, 244 Cl, 5% AGE | 45.00 | | 45.00 | | |
| Epichlorohydrin Terpolymer, 29.5% Cl, 11% AGE | | 45.00 | | 45.00 | |
| 33%, Acrylonitrile Bound Antioxdant Terpolymer | 55.00 | 55.00 | 55.00 | 55.00 | 100.00 |
| Ether-thio-ether Plasticizer | 10.00 | 10.00 | 10.00 | 10.00 | 10.00 |
| Amorphous Silica | 35.00 | 35.00 | 35.00 | 35.00 | 35.00 |
| Magnesium Oxide | 10.00 | 10.00 | 10.00 | 10.00 | 10.00 |
| ASTM N 990 Black | 10.00 | 10.00 | 10.00 | 10.00 | 10.00 |
| N,N'-m-phenylene-dimalemide | 0.50 | 0.50 | 1.00 | 1.00 | 1.00 |
| Styrenated Amine | 0.50 | 0.50 | 1.00 | 1.00 | 1.00 |
| Internal Lubricant | 1.00 | 1.00 | 1.00 | 1.00 | 1.00 |
| Bis(2,4-di-butylphenyl) Pentaerythritol Diphosphate | | 0.50 | 0.50 | 0.50 | |
| Epoxy Soya Oil | | 5.00 | 5.00 | 5.00 | |
| Calcium Stearate | | 1.00 | 1.00 | 1.00 | |
| Trimethylol Propane Trimethacrylate | 2.50 | 2.50 | 2.50 | 2.50 | 2.50 |
| Sodium Stearate | 1.50 | 1.50 | 1.50 | 1.50 | 1.50 |
| Calcium Oxide | 1.50 | 1.50 | 1.50 | 1.50 | 1.50 |
| Dicumyl Peroxide, 40% Active | 2.50 | 2.50 | 2.50 | 2.50 | 2.50 |
| | 175.50 | 175.50 | 183.50 | 183.50 | 183.50 |
| Specific Gravity | 1.302 | 1.306 | 1.285 | 1.297 | 1.202 |
| Compression Set B, 70 Hours @ 121° C. | 37.4 | 32 | 33.3 | 28.9 | 22.4 |

Replacing part of the black with 35 parts per hundred of silica in the table caused the cured samples to pass the standard for properties when the cured rubber was tested in hot ageing in fuel and oil.

TABLE VI

Stabilizer Addition to CHEMIGUM HR/ECO Blends

| | A5 | B5 | C5 |
|---|---|---|---|
| Hydrin TX-1 | 40 | 40 | |
| CHEMIGUM HR 662 | 60 | 60 | 100 |
| Therm-Chek 196 | 1.3 | | |
| Therm-Chek 1180 | 0.9 | | |
| Therm-Chek 923 | 0.1 | | |
| Mark 6708 | | 1.2 | |
| Mark 6045 | | 1.7 | |
| Vulkanol OT | 10 | 10 | 10 |
| Hi-Sil 243LD | 35 | 35 | 35 |
| MT Black, ASTM N990 | 10 | 10 | 10 |
| Ultranox 626 | 1 | 1 | 1 |
| Naugard 445 | 1 | 1 | 1 |
| Calcium Stearate | 1 | 1 | 1 |
| Trimethylene Propane Trimethacrylate | 2.5 | 2.5 | 2.5 |
| Sodium Stearate | 1.5 | 1.5 | 1.5 |
| (CaO) | 1.6 | 1.6 | 1.6 |
| DiCup 40° C. | 2.5 | 2.5 | 2.5 |
| | 181 | 182 | 176.1 |
| Specific Gravity | 1.349 | 1.352 | 1.197 |
| Mooney ML-4'/100° C. | 41 | 43 | 41 |
| Ozone Resistance, 7 days @ 38° C. 50 pphm | | | |
| 20% Stretch | pass | pass | fail, 24 hrs |
| Bent Loop | pass | pass | fail, 24 hrs |
| Tensile, MPa | 9.7 | 9.1 | 11.3 |
| % Elongation | 434 | 411 | 736 |
| 300% Modulus | 754 | 787 | 304 |
| Shore A Hardness | 62 | 63 | 54 |
| Air Oven Aging, 7 day @ 150° C. | | | |
| Tensile, MPa | 9.7 | 9.4 | 9.8 |
| % Chg | 0 | 3 | −13 |
| Elongation | 144 | 137 | 540 |
| % Chg | −67 | −67 | −27 |
| Shore A Hardness | 85 | 85 | 71 |

In Table VI blend Nos. A5 and B5 are compared with 100% CHEMIGUM HR662 viz. No. C5 to show the superior ozone resistance of the blends relative to 100% CHEMIGUM 662. Thus, the blends of the CHEMIGUM 662, acrylonitrile/butadiene rubbers, and epichlorohydrin passed the ozone resistance test and was able to be used where ozone resistance is needed.

TABLE VII

| | 347003 |
|---|---|
| 60 TX-1/40 HR662 | 103.00 |
| Mistron Vapor | 50.00 |
| Hi-Sil 532EP | 40.00 |
| Hi-Sil 243LD | 15.00 |
| Mercapto-Silane Coupling Agent | 1.00 |
| AC-629A | 1.00 |
| Hercoflex 600 | 15.00 |
| N990 Carbon Black | 10.00 |
| MgO | 10.00 |
| Naugard 445 | 1.00 |
| Irganox MD1024 | 2.00 |
| Vanox ZMTI | 1.00 |
| Ultralox 626 | 0.50 |
| Paraplex G-652 | 5.00 |
| Ba/Zn Stablizer | 1.80 |
| Na-Perchlorate Stablizer | 2.50 |
| Sartomer SR 350 | 1.50 |
| Dicumyl Peroxide 40% | 2.00 |
| Zisnet F-Pt | 0.50 |
| | 262.80 |
| Rheometer, 325° F., 3° | 30 Minutes |
| Torque, Min. | 6.0 |
| Torque, Max | 78.5 |
| TS 2 | 2.5 |
| T'C50 | 8.2 |
| T'C90 | 20.5 |
| Rheometer, 380° F., 3° | 13 Minutes |
| Torque, Min. | 6.5 |
| Torque, Max. | 82.0 |
| TS 2 | 0.8 |
| T'C50 | 1.7 |
| T'C90 | 3.5 |

TABLE VII-continued

|  | 347003 |
| --- | --- |
| ML-4 Min./212° F. | 52 |
| Scorch, MS/250° F. | |
| Minimum | 20 |
| T3 | 0.0 |
| 20 Min. | 19.9 |
| Specific Gravity | 1.534 |

TABLE VIII

|  | 347003 |
| --- | --- |
| Original Properties | |
| Tensile, PSI | 1164 |
| Elongation, % | 477 |
| 100% Modulus | 509 |
| 200% Modulus | 651 |
| 300% Modulus | 795 |
| Hardness, Shore A | 78 |
| Tear, Die(C) PPI | 182 |
| Compression Set 70 Hrs @ 212° F. | |
| Average | 37.40 |
| Circ.Air Oven Aging - 70 Hrs @ 257° F. | |
| Tensile, PSI | 1075 |
| % Change | −8 |
| Elongation, % | 313 |
| % Change | −34 |
| 100%, Modulus | 729 |
| Hardness, Shore A | 80 |
| Point Change | 2 |
| Static Ozone Box 50 pphm 104° F.D-1171 | |
| Rating @ 3 Days | Pass |
| Fluid Aging 70 Hrs at 300° F., ASTM No 3 Oil | |
| Tensile, PSI | 1023 |
| % Change | −12 |
| Elongation, % | 255 |
| % Change | −47 |
| Hardness, Shore A | 78 |
| Point Change | 0 |
| Vol.Swell, %, | 1.9 |
| Fluid Aging 48 Hrs at RT F, ASTM Ref Fuel C | |
| Tensile, PSI | 720 |
| % Change | −38 |
| Elongation, % | 385 |
| % Change | −19 |
| Hardness, Shore A | 57 |
| Point Change | −21 |
| Vol.Swell, % | 27.8 |

Table VIII shows properties of a 60% epichlorohydrin blend with 40% acrylonitrile/butadiene with bound antioxidant cured with high silica loading viz mistron vapor, Hi-Sil 532EP and Hi-Sil 243LD with 10 part carbon black at various cure conditions. This table also shows hot fluid aging results needed for hose or belt use under the hood of a vehicle.

While certain representative embodiments and details have been shown for the purpose of illustrating the invention, it will be apparent to those skilled in this art that various changes and modifications may be made therein without departing from the spirit or scope of the invention.

What is claimed is:

1. A blend of (1) acrylonitrile-butadiene bound antioxidant terpolymer rubber comprised of a polymer of acrylonitrile-butadiene-N(4-anilinophenyl)methacrylamide and (2) a epichlorohydrin rubber, said bound antioxidant terpolymer rubber containing from 28% to 33% by weight of acrylonitrile and is present in blend in about 75% to 25% and said epichlorohydrin being selected from the class consisting of a copolymer of epichlorohydrin and allyl glycidal ether and a terpolymer of epichlorohydrin, allyl glycidal ether and ethylene oxide, said allyl glycidal ether being present in the epichlorohydrin in an amount of about 4 to about 12% by weight and is present in blend in about 25 to about 75% and the ethylene oxide being present in terpolymer in 15 to 35% by weight.

2. The blend of claim 1 cured with a peroxide curative.

3. The blend of claim 1 wherein the blend contains about 50 to about 10% of epichlorohydrin polymer and about 50 to about 10% acrylonitrile/butadiene polymer.

4. The blend of claim 2 further comprising at least 50% by weight of a mineral filler.

5. The blend of claim 2 further comprising a filler other than carbon black.

6. The blend of claim 3 wherein the blend further comprises silica.

7. A blend of bound antioxidant acrylonitrile-butadiene rubber comprising polymer of acrylonitrile-butadiene-N(4-anilinophenyl)methacrylamide and a epichlorohydrin rubber, said acrylonitrile-butadiene rubber containing from 28% to 33% by weight of acrylonitrile and is present in blend in about 90% to 10% and said epichlorohydrin being selected from the class consisting of a copolymer of epichlorohydrin and allyl glycidal ether and a terpolymer of epichlorohydrin, allyl glycidal ether and ethylene oxide, said allyl glycidai ether being present in the epichlorohydrin in an amount of about 4 to about 12% by weight and is present in blend in about 10 to about 90% and the ethylene oxide being present in terpolymer in 15 to 35%.

8. The blend of claim 7 cured with a peroxide curative.

9. The blend of claim 7 wherein the blend contains about 50 to about 10% epichlorohydrin polymer and about 50 to about 10% acrylonitrile/butadiene polymer.

10. The blend of claim 8 further comprising at least 50% by weight of a mineral filler.

11. The blend of claim 8 further comprising a filler other than carbon black.

12. The blend of claim 9 wherein the blend further comprises silica.

13. The blend of claim 7 wherein the epichlorohydrin rubber contains 29 or more percent chlorine and at least 11% of allyl glycidal ether.

* * * * *